(12) United States Patent
Samarasooriya

(10) Patent No.: US 6,937,671 B2
(45) Date of Patent: Aug. 30, 2005

(54) METHOD AND SYSTEM FOR CARRIER RECOVERY

(75) Inventor: Vajira N. S. Samarasooriya, Ottawa (CA)

(73) Assignee: Spacebridge Semiconductor Corporation, Hull (CA)

( * ) Notice: Subject to any disclaimer, the term of this patent is extended or adjusted under 35 U.S.C. 154(b) by 629 days.

(21) Appl. No.: 09/813,795

(22) Filed: Mar. 22, 2001

(65) Prior Publication Data

US 2001/0024479 A1 Sep. 27, 2001

(30) Foreign Application Priority Data

Mar. 22, 2000 (CA) .............................. 2302004

(51) Int. Cl.$^7$ .............................................. H04L 27/22
(52) U.S. Cl. ....................................... 375/326; 375/344
(58) Field of Search ................................ 375/326, 327, 375/344, 376; 327/156; 455/182.2, 192.2

(56) References Cited

U.S. PATENT DOCUMENTS

| | | | | |
|---|---|---|---|---|
| 5,412,693 A | * | 5/1995 | Bolla et al. ................. | 375/326 |
| 5,471,508 A | | 11/1995 | Koslov | |
| 5,692,014 A | | 11/1997 | Basham et al. | |
| 6,032,028 A | * | 2/2000 | Dickey et al. ............... | 455/110 |
| 6,356,598 B1 | * | 3/2002 | Wang ......................... | 375/326 |

OTHER PUBLICATIONS

"Self–recovering Equalization and Carrier Tracking in Two Dimensional Data Communication Systems", Dominique N. Godard, IEEE Transactions on Communications, vol. COM–28, No. 11, Nov. 1980, pp 1867–1875.

"Carrier Recovery for Blind Equalization", Neil K. Jablon, IEEE ICASSP Rec., May 23–26, 1989.

"Joint Blind Equalization, Carrier Recovery, and Timing Recovery for High–order QAM signal Constellations", Neil K. Jablon, IEEE Transactions on Signal Processing, vol. 40, No. 6, Jun. 1992.

"Blind Carrier Phase Acquisition for QAM Constellations", Costas N. Georghiades, IEEE Transactions on Communications, vol. 45, No. 11, Nov. 1997.

* cited by examiner

Primary Examiner—Betsy L. Deppe
(74) Attorney, Agent, or Firm—Dilip C. Andrade; Borden Ladner Gorvais LLP

(57) ABSTRACT

A method and sytem for achieving carrier frequency synchronization in a high speed receiver. A feedback loop in a carrier recovery system is operated at a down-sampled rate until carrier lock is detected. The output of a phase accumulator, operating at the down-sampled rate, is then extrapolated to provide extrapolated outputs to provide outputs at the original symbol rate. Addresses for a look-up table are then generated from the combined phase accumulator outputs and extrapolated outputs, such that the frequency and phase compensation offsets provided to a phase derotator and slicer are at the original symbol rate. The total pipeline delay as seen by the carrier recovery system is thus reduced. This in turn allows for more efficient correction of residual carrier frequency errors present in a complex baseband signal.

14 Claims, 5 Drawing Sheets

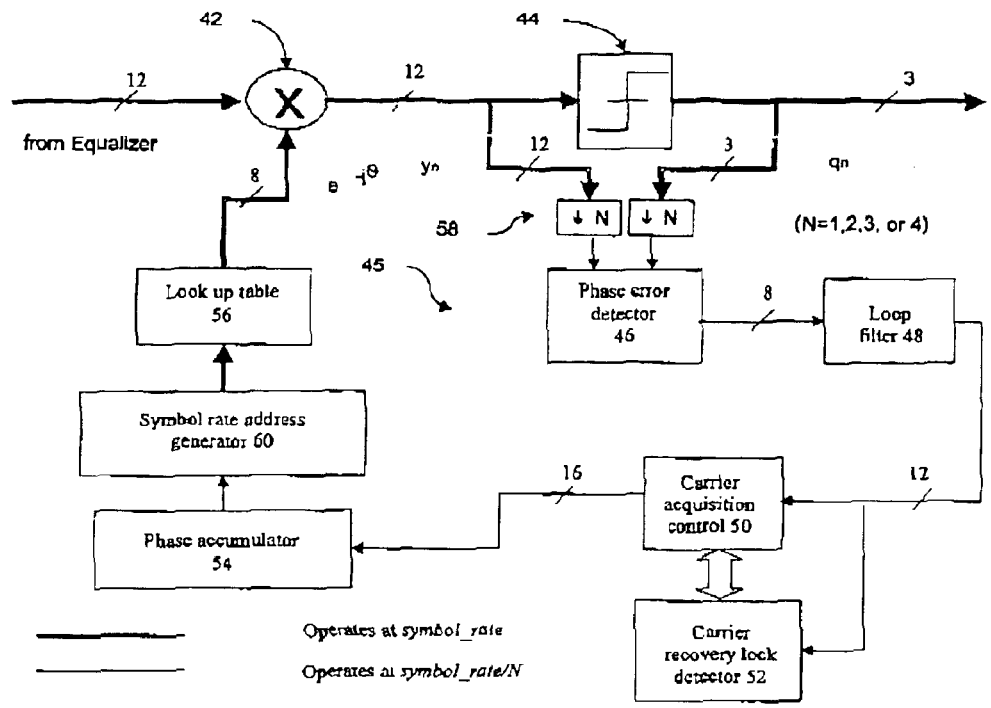
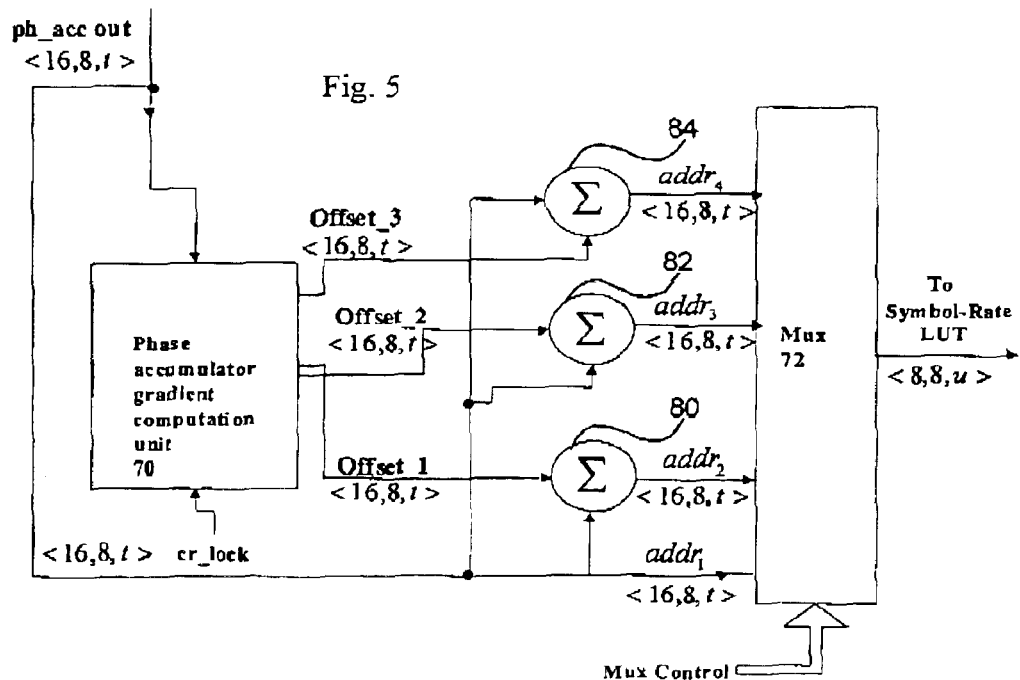

METHOD AND SYSTEM FOR CARRIER RECOVERY

FIELD OF THE INVENTION

The present invention relates to a method and system for achieving carrier frequency synchronization in a high speed receiver. In particular, the present invention relates to the carrier recovery loop in a high-speed digital demodulator that compensates for the phase and frequency offsets that are present in the complex baseband signal recovered from the receiver.

BACKGROUND OF THE INVENTION

In modem digital receivers, the digital complex baseband signal recovered from the analog-to-digital converter invariably contains residual carrier frequency errors due to mismatches between the transmit and receive local oscillators. These residual carrier errors must be removed before the baseband signal can be further processed and outputted. One system for correcting this residual carrier error uses a carrier recovery loop circuit that provides compensating feedback phase and frequency offsets to the corrupted complex baseband signal. FIG. 1 illustrates the interconnectivity of such a carrier recovery loop 20 between an equalizer 22 and an air interface processor 24, and a carrier recovery (CR) sub-system 25.

As further shown in FIG. 2, a typical CR loop 20 consists of the following components: a phase derotator 26, a slicer 27, and the CR subsystem 25 consisting of a phase error detector 28, a loop filter 30, a carrier acquisition control 32, a phase accumulator and sine and cosine look-up table (LUT) 34, and a CR lock detector 36. In operation, the CR loop 20 remains inactive following power-up until the air interface processor (AIP) 24 in FIG. 1 gives a carrier-synchronization-enable signal. The carrier loop 20 works in collaboration with the equalizer 22. The AIP 24 activates the CR loop 20 once the equalizer Constant Modulus Algorithm (CMA) mode has converged sufficiently. It is assumed that the frequency offset encountered by the CR loop 20 is in the order of ±5% of the highest symbol rate of the digital demodulator. The carrier loop 20 can operate at a rate of one sample per symbol or at a reduced rate as programmed by the air interface processor 24. In lower data rate applications where the equalizer 22 is not required, the equalizer taps are by passed. However, the slicer 27 will still continue to feed the quantized decisions ($q_n$) to CR loop 20. Typically, the input ($y_n$) to the slicer 27 has a word length of 12-bits and the output ($q_n$) is 3-bits wide. Both $y_n$ and $q_n$ feed the CR sub-system 25.

When the initial frequency offset encountered by the carrier recovery loop 20 is in the order of ±5% of the symbol rate, the CR loop 20 cannot always lock on to, and compensate for, the incoming offset frequency in an unaided fashion. Therefore, the following acquisition technique has been used in prior art sytems to achieve better carrier lock. The frequency of the VCO is swept linearly across the range spanning the maximum frequency offset encountered by the receiver. This is done by feeding a linearly changing dc-voltage to the output of the loop filter of FIG. 2 prior to the phase accumulator 34. When the VCO frequency and the residual offset frequency at the phase derotator 26 input coincide, the carrier loop 20 will lock, and the lock detector 36 indicates to the acquisition control unit 32 to freeze the dc sweep value. The CR loop 20 enters tracking mode at this point. FIG. 3 illustrates the carrier acquisition process of a typical carrier recovery loop sub-system.

In a high-speed receiver system, hardware realization of the multipliers and adders used in the CR sub-system 25 can produce pipeline delays that are based on the number of hardware clock cycles available for performing computations. Given a maximum operating clock frequency of the system, there are a limited number of hardware clock cycles between consecutive data samples at the higher data rates. For instance, at data rates of 155 Mbits per second, the maximum clock frequency becomes close or equal to the typical data sampling-rate. Each hardware multiplication and addition operation in the carrier recovery feedback loop 20 will therefore introduce pipeline delays. The presence of such delays in the feedback loop 20 introduces instabilities in the carrier acquisition scheme due to the addition of unwanted poles in the closed loop system response. When there is an excessive number of delays present in the feedback loop, the carrier loop 20 is not able to achieve carrier lock even with an aided acquisition scheme.

It is, therefore, desirable to provide a method and system for alleviating the adverse effects of pipeline delays in a carrier recovery loop.

SUMMARY OF THE INVENTION

It is an object of the present invention to obviate or mitigate at least one disadvantage of previous systems and methods for carrier recovery in digital communication systems.

In a first aspect, the present invention provides a frequency compensation method for a carrier recovery system in a digital demodulator. The method consists of reducing a sampling rate, from a symbol rate to a down-sampled rate, of signals by a down-sampling factor. The signals are received at a phase error detector from a phase derotator and a slicer. When a carrier lock condition is detected at the down-sampled rate, the outputs of a phase accumulator are determined. Extrapolated outputs, between successive determined outputs, can then be extrapolated to generate addresses to a symbol rate look-up table. Compensating frequency and phase compensation offsets, for input to the phase derotator, can then be looked up at the generated addresses.

In a presently preferred embodiment, the down-sampling factor is determined such that a predetermined maximum allowable pipeline delay is not exceeded. The down-sampling factor can be derived from the symbol rate and the channel condition. The extrapolated outputs are determined by calculating a gradient of the phase accumulator outputs. The address generation is accomplished by combining the phase accumulator outputs and the extrapolated outputs, and reformatting the combined phase accumulator outputs and extrapolated outputs.

In a further aspect, the present invention provides a carrier recovery system for a digital receiver. The carrier recovery system includes a phase derotator for derotating a signal received from an equalizer, a slicer, communicating with the phase derotator, for providing a quantized decision of the signal, and a feedback loop. The feedback loop has down-sampling means that reduce the sampling rate of signals from the phase derotator and the slicer by a down-sampling factor, from a symbol rate to a down-sampled rate. A phase error detector detects phase errors at the down-sampled rate, feeds the detected errors to a loop filter, a carrier acquisition control and carrier recovery lock, which then determine a carrier lock condition. A phase accumulator then provides outputs at the down-sampled rate, which are used by a look-up table address generation unit to extrapolate extrapolated outputs between the phase accumulator outputs to provide look-up table addresses at the symbol rate. A symbol rate look-up table is then used to generate, by reference to the look-up table addresses, compensating frequency and phase compensation offsets for input to the phase derotator.

In a presently preferred embodiment, the down-sampling means includes means for determining the down-sampling factor such that a predetermined maximum allowable pipeline delay is not exceeded, based on the symbol rate and data channel condition. The look-up table address generation unit includes a gradient computation unit for determining a gradient of the outputs of the phase accumulator, for combining the outputs of the phase accumualator and the extrapolated outputs, and reformatting the combined phase accumulator outputs and extrapolated outputs to provide the look-up table addresses. The look-up table address generation unit includes a multiplexer unit for providing the look-up table addresses to the symbol rate look-up table.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 4 is a block diagram of a carrier recovery system according to the present invention;

FIG. 5 is a block diagram of a look-up table address generation unit according to the present invention;

DETAILED DESCRIPTION

Figure 1:
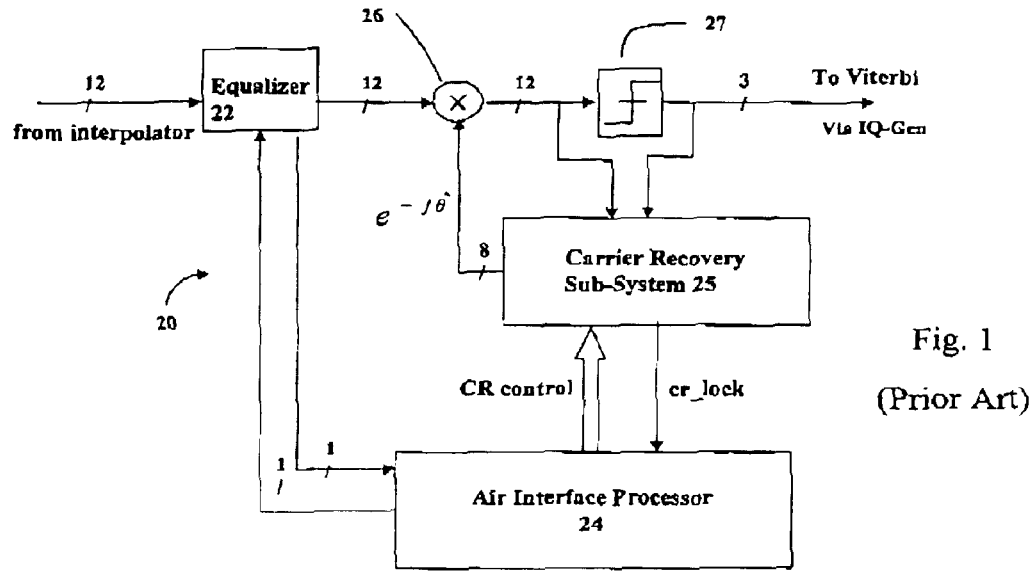
FIG. 1 is a block diagram showing the prior art interconnection between an equalizer, an air interface processor and a carrier recovery system.
Figure 2:
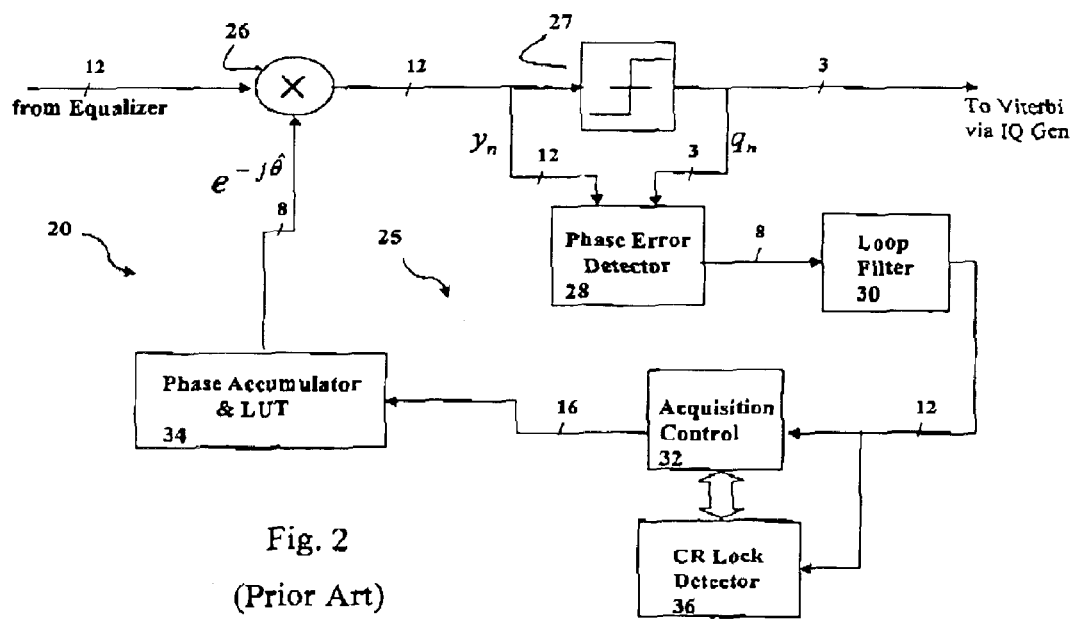
FIG. 2 is a block diagram of a prior art carrier recovery system.
Figure 3:
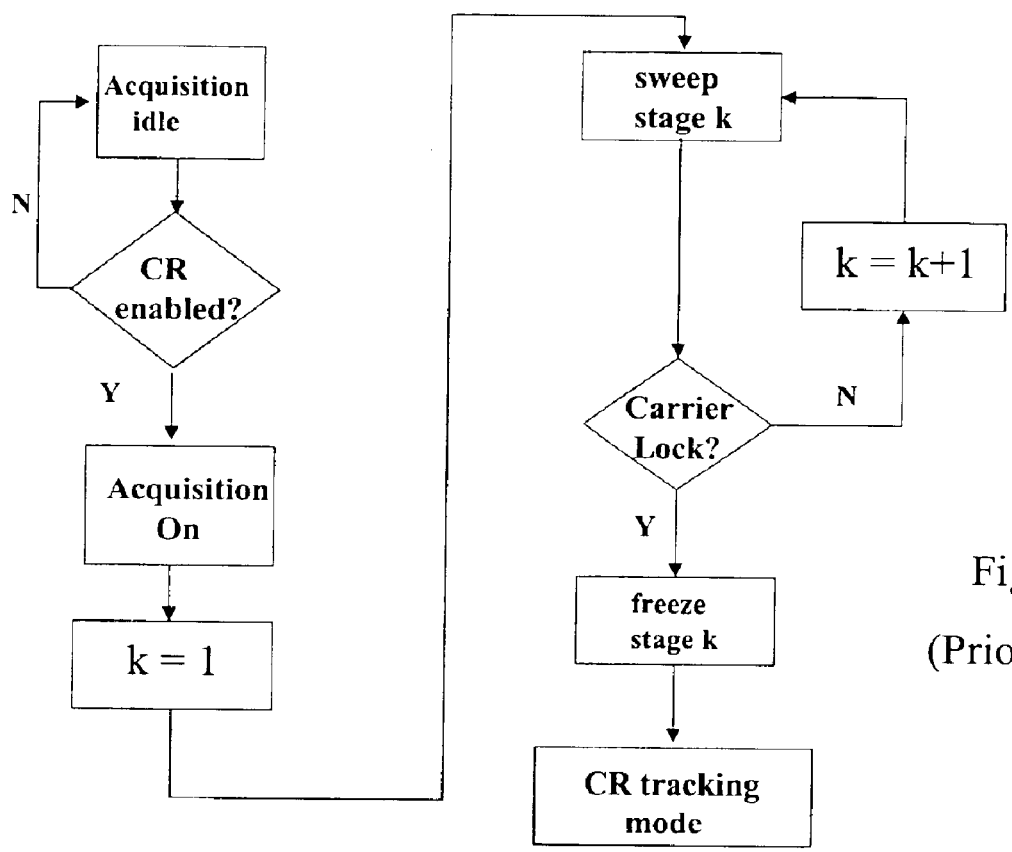
FIG. 3 is a flow chart showing the carrier acquisition process in a prior art carrier recovery system.

Referring to FIG. 4, a carrier recovery system 40 according to the present invention is shown. The carrier recovery loop forms part of a high data rate digital demodulator, or digital receiver, and compensates for carrier frequency errors due to mismatches between transmit and receive local oscillators. Typically, the carrier recovery loop 40 operates in conjunction with an equalizer (not shown), from which it receives a filtered signal. The resulting compensated signal is provided to timing recovery and IQ generator modules (not shown) for further processing.

The carrier recovery system 40 consists of a phase derotator 42, a slicer 44, and a feedback loop 45 having a phase error detector 46, a loop filter 48, a carrier acquisition control 50 communicating with a carrier recovery lock detector 52, a phase accumulator 54, and a sine cosine look-up table 56, as in previously known carrier recovery loops. In addition, the carrier recovery loop 40 includes down-sampling means 58, and a symbol rate address generation unit 60, the operation of which will be described below.

Generally, the present invention provides a method and system for alleviating the adverse effects of pipeline delays on the carrier recovery system 40 in high data rate systems. The present invention employs a combination of reduced sampling rate at the phase error detector 46 and an extrapolation method for reconstructing the sampling rate to the original symbol rate at the look-up table(s) 56. Hardware realization of the multipliers and adders in a conventional carrier recovery system result in pipeline delays that are based on the number of hardware clock cycles available for performing computations. Given the maximum operating clock frequency of the system, there are a limited number of hardware clock cycles between consecutive data samples at the higher data rates. for example, at data rates of 155 Mbits per second, the maximum clock frequency becomes close or equal to the data sampling-rate. Each multiply and add operation in the carrier recovery feedback loop will therefore, introduce pipeline delays. The presence of pipeline delays in the feedback loop introduces instability by the addition of unwanted poles in the closed loop system response. When there is an excessive number of delays present in the feedback loop, the carrier recovery system 40 will not be able to achieve carrier lock even with an aided acquisition scheme. For receivers operating at lower incoming data rates, reduced sampling is not necessary because more hardware clock cycles are available for computations between samples, therefore the carrier loop does not need to be run at a reduced rate.

This method of the present invention is accomplished as follows: The input to the phase error detector 46 is down-sampled by a factor of N (N=1, 2, 3, 4 . . . ) by the down-sampling means 58. This causes the feedback loop of the carrier recovery system 40 to run at a lower, down-sampled rate of symbol_rate/N. At this lower operating rate, more hardware clock cycles are available for computations between successive samples within the feedback loop of the carrier recovery system 40. The net effect is that the pipeline delays seen by the phase derotator 42 and slicer 44 will be reduced. The feedback loop of the carrier recovery system 40 is operated at the reduced rate until carrier lock is achieved. Using combined down-sampling and acquisition control techniques, it is possible to handle up to a predetermined maximum number of pipeline delays in the carrier recovery system 40. Based on the highest operating clock frequency, the selection of down-sampling factor in a presently preferred embodiment is based on the symbol transmission rate, or symbol rate, and channel condition such that the total number of pipeline delays seen by the feedback loop does not exceed the maximum allowable delay. The down-sampled rate at which the feedback loop of the carrier recovery system 40 operates is programmed by an air interface processor (not shown) that controls carrier recovery in the digital receiver, and to which the carrier lock condition is communicated.

While reducing the symbol rate to the down-sampled rate alleviates the pipeline delay in the carrier recovery system 40, it creates another problem in closing the recovery loop. Since the phase derotator 42 and slicer 44 must always operate at the symbol rate, it is necessary that the down-sampled rate be reconverted to the original symbol rate before passing to the look-up table 56. This reconversion is performed by an extrapolation technique between the phase accumulator 54 and the look-up table 56 that regenerates the carrier phase/frequency correction offsets for the phase derotator 42 at the original symbol rate. The symbol rate address generation unit 60, at the output of the phase accumulator 54 reconstructs the reduced sample rate to the original symbol rate at the look-up table 56.

The down-sampled carrier feedback loop is run until the carrier acquisition control 50 and the lock detector 52 determine that carrier lock has been achieved. At this point, the phase accumulator output displays a constant slope that is proportional to the carrier offset encountered by the loop. To restore the original symbol rate, the current value of the phase accumulator output is extrapolated in order to generate N−1 more addresses for the look-up table 56 between consecutive output samples from the phase accumulator. This procedure is shown in greater detail in FIGS. 5, 6, and 7.

Figure 6:
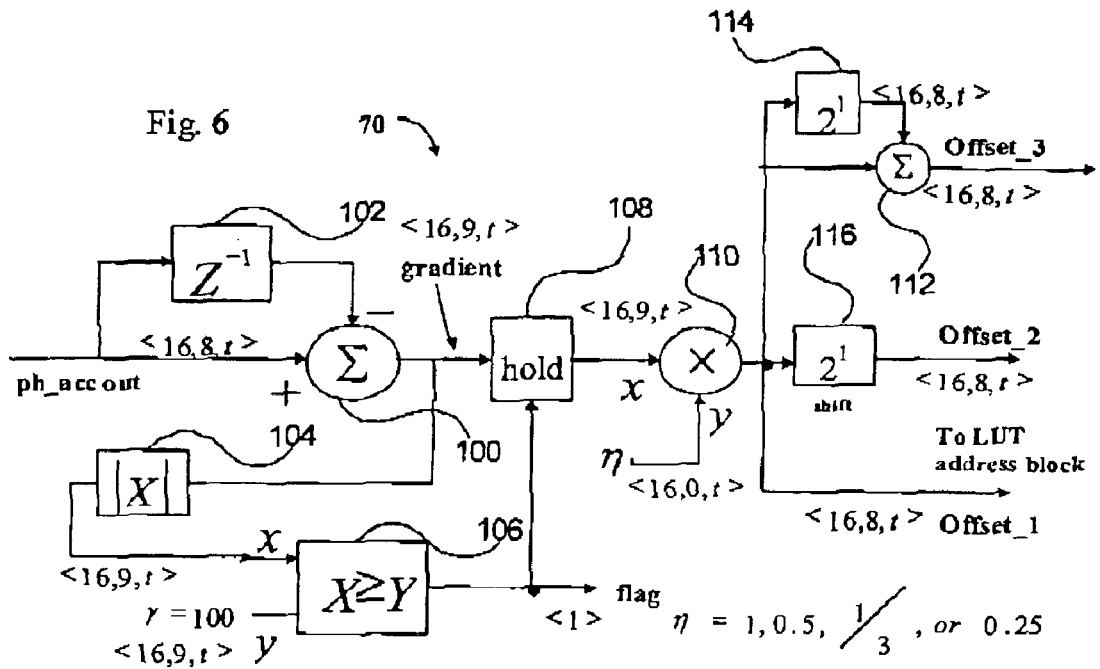
FIG. 6 is a diagram showing a phase accumulator gradient calculation unit according to the present invention.
Figure 7:
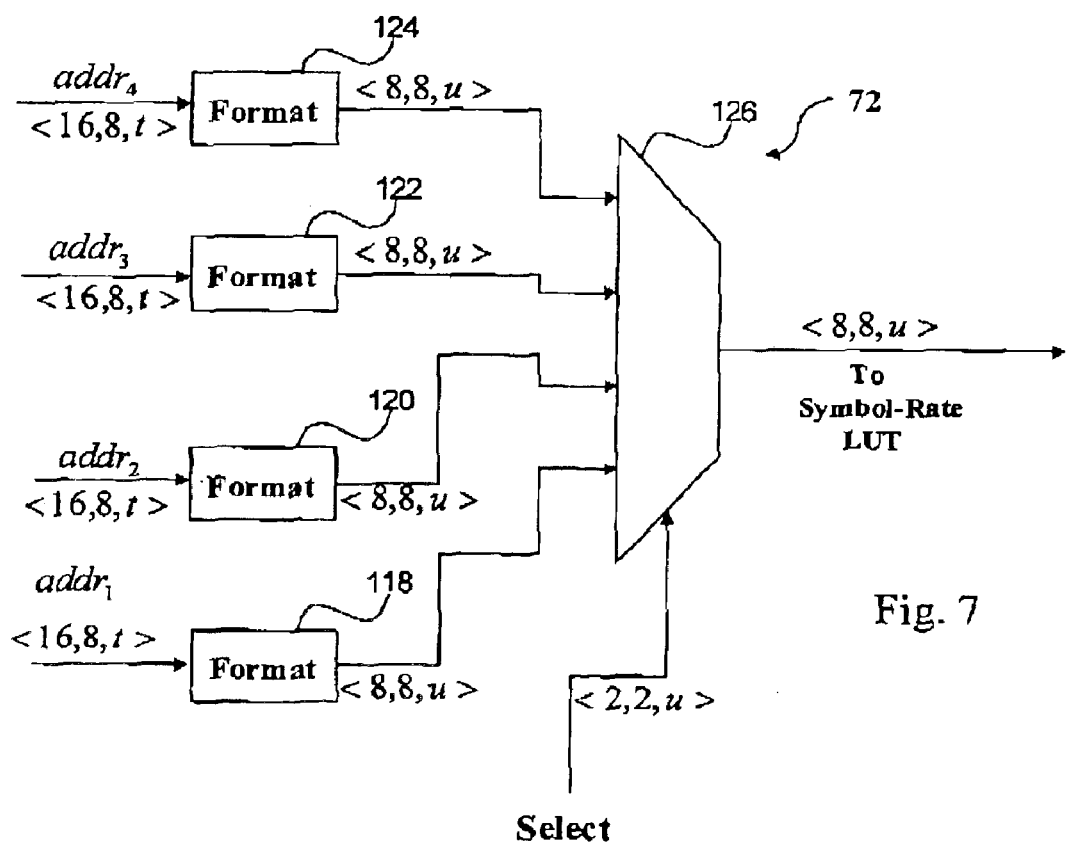
FIG. 7 is a diagram showing a multiplexing according to the present invention.
Figure 8:
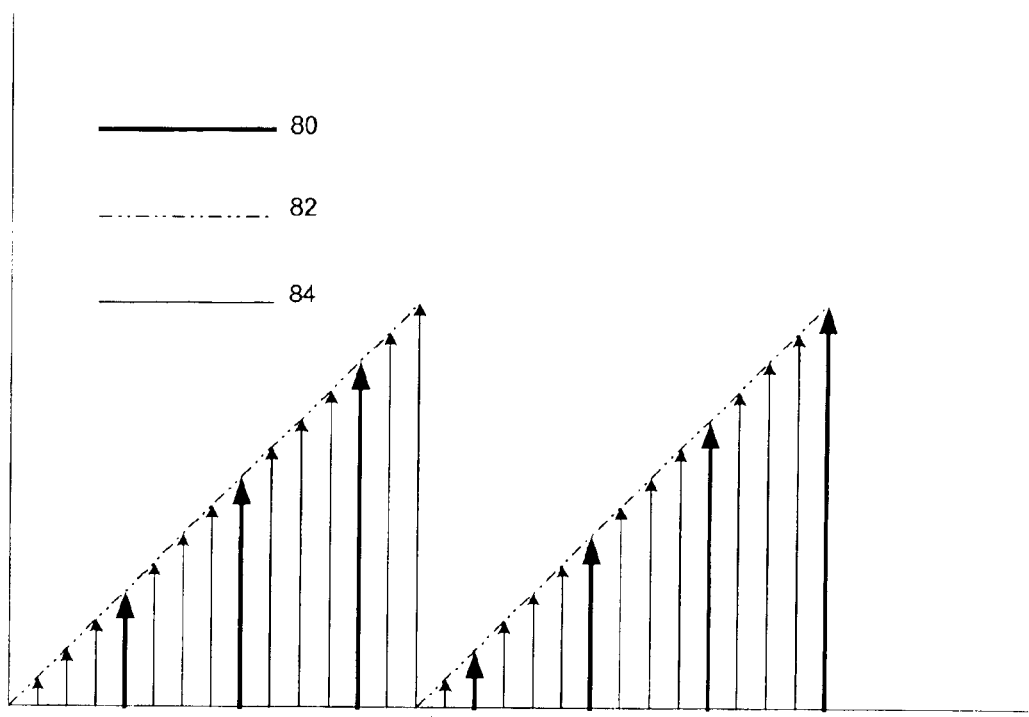
FIG. 8 is a diagram of exemplary phase accumulator outputs and extrapolated points according to the present invention.

Referring to FIG. 5, the address generation unit 60 is shown In greater detail. A phase accumulator output gradient computation unit 70 operates at symbol_rate/N, where N=4. Once a slope value has been computed, the additional N−1 phase accumulator outputs are obtained by adding the offset values to the current phase accumulator output as shown. The N phase accumulator outputs are reformatted to generate N look-up table addresses. These N look-up table addresses are then selected consecutively by a multiplexer (Mux) unit 72 to address the look-up table 56. The Mux unit select signal operates at the symbol rate. FIGS. 6 and 7 show presently preferred functional configurations for the phase accumulator gradient computation unit 70 and Mux unit 72, respectively. Referring to FIG. 8, the phase accumulator gradient computation unit 70 is shown in greater detail. Adder 100 provides as an output the difference between the output of the phase accumulator 54 and the 'phase accumulator output delayed-by-one-sample', based on the output of the phase accumulator 54. In the presently illustrated example the discrete transform output is provided by inverse Z transform processor 102. At this point, the signals are generated as 16 bit values. The output of adder 100 is a gradient that is provided as input to both hold unit 108 and a magnitude determining unit 104. Magnitude determining unit 104 determines the magnitude of the gradient, and provides the magnitude to comparator 106. Comparator 106 provides a comparison flag as its output indicating whether or not the magnitude of the gradient is equal to or in excess of a predetermined threshold Y, which in the presently illustrated embodiment is 100. When the flag output of comparator 106 indicates that the gradient is greater than the predetermined threshold, the comparator output signals to the hold unit to block the high gradient value from being passed to the multiplier 110. The previously computed gradient value is passed instead. This is necessary to prevent incorrect high gradient values (resulting from phase-accumulator wrap-around) from being passed on to the next stage. The hold unit 108, provides the gradient value to multiplier 110 where it is multiplied by a function of η. The value of η is shown in comparator 106 indicates that the gradient is sufficiently high, hold unit 108 provides the gradient value to multiplier 110 where it is multiplied by a function of η. The output of multiplier 110 is used to determine offset values. The first offset value, Offset 1, is a 16 bit representation of the output of multiplier 110. The second offset value, Offset 2, is the 16 bit output of bit shifter 116 which shifts the output of multiplier 110 by 1 bit. The third offset value, Offset 3, is the 16 bit output of adder 112, which sums the output of multiplier 110 and the output of bit shifter 114, which shifts the output of multiplier 116 by 1 bit. Referring to FIG. 7, mux unit 72 is shown in greater detail.

The N phase accumulator outputs are provided as $addr_1$–$addr_4$, which are 16 bit values. $Addr_1$–$Addr_4$ are provided to format application units 118, 120, 122 and 124 respectively. Each of the format application units converts its respective $addr_x$ value from a 16 bit representation to an 8 bit address value which is then provided to multiplexer 126. Multiplexer 126 is controlled by a 2 bit select signal which sequentially selects the 8 bit addresses provided as input. The output of multiplexer 126 is then sent to the symbol-rate look-up table 56. In further reference to FIG. 5, $addr_1$ is the 16 bit phase accumulator output, ph acc out. $Addr_2$ is the output of an adder 80 that receives both Offset 1 and the ph acc out, as input. $Addr_3$ is the output of an adder 82 that receives both Offset 2 and the ph acc out, as input. $Addr_4$ is the output of an adder 84 that receives both Offset 3 and the acc out, input.

Referring to FIG. 8, an example of the phase accumulator output once carrier lock has been achieved is shown. In the example, a down-sampling factor of N=4 is used. The phase accumulator outputs at the down-sampled rate are referenced at 80. The expected phase accumulator output is a quantized sawtooth, as shown by the dashed line 82. Therefore, the gradient, or slope, between the down-sampled outputs can be determined, as shown in FIG. 6, and a linear extrapolation based on the determined slope can be used to extrapolate the N−1 extrapolated outputs 84 (i.e. three in the example shown). The combination of the actual phase accumulator outputs 80, at the down-sampled rate, and the extrapolated outputs 84 provide an extrapolated phase accumulator output at the original symbol rate used to generate addresses for input to the look-up table.

In summary, for high data rate receivers, the present invention provides a combination of down-sampling and extrapolation methods to operate the feedback loop in a carrier recovery system 40 at a reduced rate, while operating its phase derotator 42 and slicer 44 at the symbol rate. The total pipeline delay as seen by the carrier recovery system is thus reduced. This in turn allows for more efficient correction of residual carrier frequency errors present in a complex baseband signal. The down-sampling rate can be programmed, by the air interface processor, for different settings based on the operating data rate of the demodulator. Since the phase derotator 42 and slicer 44 must always operate at the symbol rate, the reduced symbol rate is reconverted to the original symbol rate for access to the look-up table. This is performed by an extrapolation technique between the phase accumulator 54 and the look-up table 56 that regenerates the carrier phase/frequency corrections for the phase derotator 42 at the original symbol rate.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. In a carrier recovery system in a digital demodulator, a frequency compensation method, comprising:

(i) at an input of a phase error detector, reducing, by a down-sampling factor, a symbol rate of signals received from a phase derotator and a slicer to a down-sampled rate;

(ii) detecting a carrier lock condition using signals from the phase derotator and the slicer with the down-sampled rate;

(iii) determining outputs of a phase accumulator;

(iv) generating extrapolated outputs between successively determined outputs of the phase accumulator (v) combining the phase accumulator outputs and the extrapolated outputs to generate addresses to a look-up table;

(vi) looking up frequency and phase compensation offsets at the generated addresses and providing the frequency and phase compensation offsets to the phase derotator.

2. The frequency compensation method of claim 1, further including determining the down-sampling factor such that a predetermined maximum allowable pipeline delay is not exceeded.

3. The frequency compensation method of claim 2, wherein determining the down-sampling factor is based on the symbol rate.

4. The frequency compensation method of claim 2, wherein determining the down-sampling factor is based on a data channel condition.

5. The frequency compensation method of claim 2, wherein determining the down-sampling factor is programmed by an air interface processor.

6. The frequency compensation method of claim 1, wherein generating the extrapolated outputs includes determining a gradient of the phase accumulator outputs.

7. A The frequency compensation method of claim 1, wherein generating the addresses further includes reformatting the combined phase accumulator outputs and extrapolated outputs.

8. A carrier recovery system for a digital receiver, comprising:

a phase derotator for derotating a signal received from an equalizer;

a slicer, communicating with the phase derotator, for providing a quantized decision of the derotated signal; and a feedback loop having down-sampling means for reducing by a down-sampling factor, a symbol rate of signals from the phase derotator and the slicer to a down-sampled rate, the feedback loop further including:

a phase error detector for detecting phase errors between the down-sampled derotated signal and the down-sampled output of the slicer;

a loop filter, a carrier acquisition control and carrier recovery lock detector for determining a carrier lock condition;

a phase accumulator for providing outputs at the down-sampled rate;

a look-up table address generation unit for generating extrapolated outputs between the phase accumulator outputs to provide look-up table addresses at the symbol rate, the look-up table address generation unit including a gradient computation unit for determining a gradient of the phase accumulator output to generate the extrapolated outputs, and the gradient computation unit including means for combining the phase accumulator outputs and the extrapolated outputs; and a look-up table for generating, by reference to the look-up table addresses, frequency and phase compensation offsets which are provided to the phase derotator.

9. The carrier recovery system of claim 8, wherein the down-sampling means includes means for determining the down-sampling factor such that a predetermined maximum allowable pipeline delay is not exceeded.

10. The carrier recovery system of claim 9, including means for determining the down-sampling factor based on the symbol rate.

11. The carrier recovery system of claim 9, including means for determining the down-sampling factor based on a data channel condition.

12. The carrier recovery system of claim 9, wherein the means for determining the down-sampling factor is programmable.

13. The carrier recovery system of claim 8, wherein the gradient computation unit includes means for reformatting the combined phase accumulator outputs and extrapolated outputs to provide the look-up table addresses.

14. The carrier recovery system of claim 8, wherein the look-up table address generation unit includes a multiplexer unit for providing the look-up table addresses to the look-up table.

* * * * *